Figure 1:
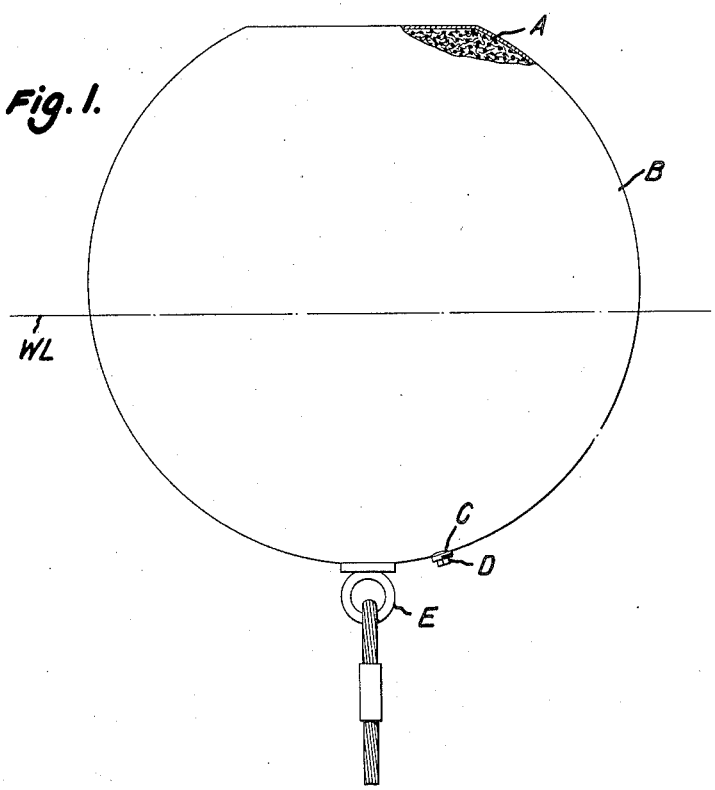

Feb. 19, 1946.	H. A. GARDNER	2,395,266

FLOAT AND FILLING MATERIAL THEREFOR

Filed April 12, 1944

Inventor:
Henry A. Gardner
By Pierce & Scheffler,
his Attorneys

UNITED STATES PATENT OFFICE 2,395,266

FLOAT AND FILLING MATERIAL THEREFOR

Henry A. Gardner, Chevy Chase, Md.

Application April 12, 1944, Serial No. 530,703

5 Claims. (Cl. 9—8)

The present invention relates to the provision of a float which will not sink even though it may be punctured. It is particularly concerned with the provision of novel filled floats.

By the term "float" is here meant the broad class of buoyant "hollow" bodies adapted to float upon water (or other liquid) and to sustain weight. This invention is not restricted to separate floats used to support some particular object below, on or above water: it also has wide application in the construction of the bulkheads or float compartments of non-sinkable boats, either hand propelled or engine propelled. It also has wide application in the construction of the hulls or/and wings of airplanes or other aircraft, where it is desired to make them unsinkable even though they may be riddled with holes during action.

For floats used in marine work, it is usual to employ a shell of cylindrical, spherical or other shape, made of structural material such as steel, plastic, or other substance. Such floats, when filled with air, have great buoyancy and may be used to suspend implements above or under water. However, when such a shell is riddled with bullets or otherwise damaged so that openings are formed in it, water immediately enters and fills the shell, and the float sinks and no longer supports its appurtenances.

An object of the present invention is the provision of a float which will not sink when punctured. Another inventive object is the provision of a filled float the filling of which will resist intrusion of water into the float when the shell of the latter is punctured.

I have found that I can overcome the defects inherent in conventional hollow floats, and that I can effect the above inventive objects by filling the float shell with a very light substance which will resist water and which will repel the entrance of water through openings which may have been made in the shell.

The class of substances I employ for this purpose includes finely divided light solid substances which will resist wetting with water. As an example of such finely divided light solid substances, I may use aluminum powder which normally contains a very thin adsorbed film of stearic acid or similar water-repelling substance. I may employ lampblack or carbon black, the surfaces of the particles of which contain traces of oily substances coincident with the process of manufacture or which may later be added. Or, I may employ metallic soaps in dry powder form, such as aluminum stearate, aluminum palmitate, or magnesium stearate. I may employ any other light inorganic or organic, relatively finely divided water-insoluble substance, the particles of which either inherently repel water or have been so treated as to repel water. For instance, I have also successfully employed, as an adjunct, cellulose or a cellulosic material which has been treated on the surface with a water-resisting agent such as aluminum stearate. I have also employed naphthalene flakes, and organic colors, e. g., p-nitraniline red.

In order to determine whether a light substance is suitable for my purpose, it is merely necessary to dust a sample of the light substance onto the surface of a body of water in a container, and then agitate the surface, e. g., with a spatula: if the light substance under test is suitable, it will float and will not drop to the bottom. If the light substance is relatively unsuitable, it will start to drop to the bottom and in a few minutes will be at the bottom or suspended in the liquid.

The filling is introduced into the shell of the float in any suitable manner, e. g., through an opening left in the shell, or during the fabrication of the shell, and the shell thereafter is closed. The amount of filling employed preferably is such as to occupy substantially all of the space within the shell, to the end that little or no empty space is provided for receiving any substantial body of water admitted through a puncture.

The invention will become further evident from a consideration of the following illustrative embodiments:

*Example 1.*—Into a small metal float which would contain ¼ pint of liquid, and which weighed 55 grams with cover, I placed 10 grams of lampblack, the particles of which would float upon water. This filling weighed less than one-tenth of what an equal volume of water would weight (125 grams). The cover was then sealed to the float, and thereafter the sealed float was punctured in several places and placed on the surface of a body of water. It was capable of supporting an additional weight of 110 grams. It floated for ten days and was still buoyant.

In a repetition of the above test, I modified the filling by substituting for a minor part (specifically, slightly more than 40% by weight) of the lampblack a water-repellent material produced by coating comminuted cellulose with stearic acid. The treated cellulose addition was found to be effective for preventing the lampblack from flowing around in the punctured can and for retarding the compacting tendency of the lampblack. The so-filled float, after being punctured, continued to be buoyant after several days' test on water.

*Example 2.*—Into a small metal float which would hold ¼ pint of water, I filled 70 grams of regular commercial aluminum powder which was stearate-coated and which floated upon water. The float was covered and punctured. I found that it would float for several days, and would support considerable weight, in the punctured state.

Example 3.—Into a metal float of ½ gallon capacity, and weighing 215 grams, I filled 555 grams of aluminum stearate. The cover weighed 70 grams. The float, after being sealed shut, was punctured and found to float very satisfactorily. It was capable of supporting a substantial weight, without sinking, for a protracted period.

Example 4.—A small metal float having a capacity of ¼ pint was completely filled with 20 grams of very finely divided fluffy magnesium stearate. The float was then covered, and thereafter was punctured in many places. I found that it would float, in the punctured state, for several days and support considerable weight, being very buoyant.

In this demonstration of the invention the large vessel of water in which the float was immersed was provided with an agitating device to keep the surface constantly rippled to simulate waves, said waves being of sufficient size to dash over the surface of the filled float.

In a continuation of the same demonstration at a later date, there was fastened to the float a basket containing weights, and it was found that the float with its content of 20 grams of magnesium stearate would easily support a total of over 100 grams of weight, without sinking.

Into this basket there was later added about 300 grams of weight in order to keep the entire float at the bottom of the water container, thus being under pressure. At the end of two days the float was removed from the bottom of the container, dried on the outside with paper, and then weighed. It was found that only insignificant amounts of water had entered and that the float was still very buoyant and capable of supporting substantial weight without sinking.

Instead of the magnesium stearate, I may employ as the filling material any other water-repellent metallic soap in comminuted form, e. g., a metallic oleate such as aluminum oleate, or a metallic palmitate, or the like.

Example 5.—10 grams of absorbent cotton was saturated with a solution of 10 grams of aluminum stearate in benzol. After driving off the solvent, the dried cotton was found to float satisfactorily. It was pulled apart and then filled in the form of alternate layers into a small metal float which would contain ¼ pint of water. As alternate layers, there was employed a total of 20 grams of aluminum stearate. The float, after being completely filled, thus contained 10 grams of treated cellulose and 20 grams of aluminum stearate. The container was punctured and found to float very satisfactorily.

The treated cellulose provided a fibrous "reinforcing" substance which retarded the flow of the aluminum stearate pigment, since I have found that most finely divided solids which resist water and which float upon water, even if the gravity thereof is greater than that of water, have a tendency to act like liquids and to flow. Treated cellulose seems to retard effectively this type of flow, and it has the added advantage of forming a water barrier for any large opening that may be made in the shell by damage to the latter.

It has been found, further, that the objects of the present invention are realized by filling the float shell with sawdust (or other forms of comminuted cellulose, or cellulose acetate granules, or granules of other cellulosic materials) treated with a surface coating of a water-repelling substance such as stearic acid, a metallic soap such as magnesium oleate and aluminum stearate, natural or artificial resins or the like or paraffin, in an amount between about 2 and about 5% based on the weight of the material being treated. For instance, 10 grams of cellulose, usually in fibrous form, may be rolled back and forth with 10 grams of aluminum stearate until the aluminum stearate has been completely worked into the fiber, covering all surfaces. I prefer, however, to first dissolve the aluminum stearate in a solvent such as toluol, and then to immerse the cellulose in this solution. The mass, removed from the liquid, is then gently heated to recover the solvent, and the dried cellulose will be found to be impregnated with aluminum stearate and in such physical condition that it permanently floats upon water. This material may constitute the whole filling, or it may be admixed with pigments such as lampblack, or the like, in the manner alluded to in Example 1 above.

For some purposes I may select a very finely divided inert substance such as kaolin or diatomaceous earth, and coat the same with a water-repellent: the coated solid repels water and will float even though its specific gravity may be somewhat greater than that of water. To coat the particles, I may heat a body of the inert finely divided solid substance with 2 to 5% by weight of a fatty substance such as stearic acid, in a closed vessel, at a temperature sufficiently high to volatilize the stearic acid. For the stearic acid I may substitute a petroleum distillate (e. g., kerosene), a resin vapor or other adsorbable water-repellent. In such cases, I may desire to associate with the so-treated particles a reinforcement of water-repellent treated cellulose, since I have found that recourse to such reinforcement often gives a desired result.

In place of treated fibrous cellulose or treated granular cellulose, I have found that I may employ as a reinforcement for my water-repellent particles a sausage casing or tubing of water-repellent material made of treated paper or cellulose acetate. These tubular elements, usually in sizes up to ¾ inch in diameter, are filled with the water-repellent finely divided solid such as lampblack or magnesium stearate, thus providing lengths of filling tubing of very light weight. This tubing is inserted through the mouth of a float until the interior of said float is completely filled with it, thus resembling intestines in form. These "intestinal" fillings for said floats function exceptionally well and will support a float in which they are placed, even though said float is punctured.

In the above illustrative examples, the floats used were very small so that the tests could be conducted easily in a laboratory. Under practical conditions, however, the containers may be very large. For instance, the floats may be as much as six feet or more in diameter. As a rule, the larger the float the greater the buoyancy obtained from this novel method since increase in size usually means proportional decrease in the weight of the shell used for the construction of the float.

I have found that lampblack, aluminum stearate, magnesium stearate, and other substances can be partially compacted in paper bags holding from one ounce to one pound each, said bags being sealed and then coated with paraffin or other waterproofing substance. These bags may be placed in a float, one on top of the other, and the bags serve to prevent further flowing or compacting of the mass.

I have also found it of interest to coat the interior of a float by flowing therein a sufficient quantity of a very heavy bodied viscous substance, such as very heavily bodied linseed oil. This will coat over the interior surface of the shell to form a rather thick film. Finely divided light solid substances such as lampblack or other water-repellent finely divided solid, e. g., magnesium stearate, with or without fibrous additions, may then be compacted into the float. Upon damage to the float, any openings made therein may often be self-sealed by the flowing characteristics of the film of oil or other adhesive that is placed on the interior of the shell.

I have also found it of interest in some instances to incorporate into the lampblack or magnesium stearate or other powdered filling material a small quantity—say five percent by weight—of calcium carbide or other chemical substance which, upon interaction with water, will give off gas, such as acetylene or other gas. Mixtures of sodium acid sulphate and sodium bicarbonate may also be used, or any other chemical substance that will give off gases in the presence of water. When such substances are present in my powdered solid mixture which is packed into a float, the entrance of small amounts of moisture or water through damaged portions of the float will cause chemical reaction to take place and gas will be given off, which will put the entire contents of the float under pressure, sometimes of sufficient magnitude to prevent the entrance of any further quantities of moisture or water.

As a rule, however, all the above additional improvements may not be necessary with the ordinary type of float.

Figure 2:
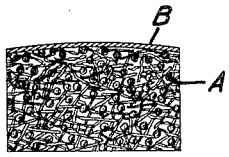

An embodiment of the invention is illustrated in the accompanying drawing, in which:

Fig. 1 is a view of a conventional float, with a part broken away to show the interior filling material, and Fig. 2 is a greatly enlarged fragmentary sectional view illustrating schematically the nature of the interior filling material.

According to the embodiment illustrated, the filling material A which constitutes the novel feature of the invention is shown enclosed within a float or buoy B of ordinary type. The filling, which completely fills the space within the float shell, is, in the illustrated embodiment, a substantially homogeneous mixture of lampblack particles and cellulosic fibers the surfaces of which had been treated with aluminum stearate as hereinbefore described. The float is provided with an orifice C which normally is closed by screw cap D, and with a carrier hook E for cable attachment.

I claim:

1. A buoyant element comprising a normally impermeable outer casing enclosing a body of filling composed of a light-weight finely divided water-insoluble solid substance the particles of which present surfaces of a water-repellent and water-insoluble fatty acid compound, said filling resisting the entrance of water thereinto, such filled buoyant element being capable of floating when punctured.

2. The buoyant element defined in claim 1, wherein the light-weight substance is a finely divided metallic soap of a high molecular weight fatty acid.

3. The buoyant element defined in claim 1, wherein the light-weight substance is stearate-coated aluminum powder.

4. The buoyant element defined in claim 1, wherein the light weight substance in comminuted form is aluminum stearate powder.

5. The buoyant element defined in claim 1, wherein the light weight substance in comminuted form is cellulose the particles of which have been water-proofed with a surface coating of a water-repellent stearate.

HENRY A. GARDNER.